Aug. 29, 1933.  R. W. CLEMMONS  1,924,541

REEL

Filed Oct. 30, 1930

Inventor
R. W. Clemmons
By J.H.B. Whitfield Att'y.

Patented Aug. 29, 1933

1,924,541

UNITED STATES PATENT OFFICE 1,924,541

REEL

Ralph W. Clemmons, Chicago, Ill., assignor, by mesne assignments, to Western Electric Company, Incorporated, New York, N. Y., a corporation of New York Application October 30, 1930. Serial No. 492,182

1 Claim. (Cl. 242—77)

This invention relates to reels, and more particularly to metallic reels for coiling wire, cables and other materials.

The object of this invention is to provide a reel which is simple and rigid in construction, economical to manufacture, durable in service, and which may be quickly and easily assembled.

In accordance with the above object, the present invention contemplates an all metallic reel particularly adapted to receive wire, which has its heads intimately secured to an interposed drum having inwardly directed flanges by bolts extending between the heads and passing through aligned apertures in the heads and flanges of the drum which have their edges embossed to fit one within the other. Specifically, the heads are apertured at spaced points with the edges of the apertures turned inwardly to correspond to the turned edges of apertures in the flanges of a drum so that with the drum positioned between the heads, the turned edges of the apertures in the heads will fit inside of the turned edges of the apertures in the drum flanges and thus provide a curved surface to receive a conical round headed nut to be secured to a bolt extending between the heads and through the apertures thereof and the drum flanges.

According to another embodiment of this invention, the heads are recessed to conform with the curvature of the drum flanges to provide an additional bearing surface for the drum.

It is believed that a complete understanding of the invention may be had by reference to the following description, taken in conjunction with the accompanying drawing, wherein Fig. 1 is an end elevational view of the reel;

Figure 1:
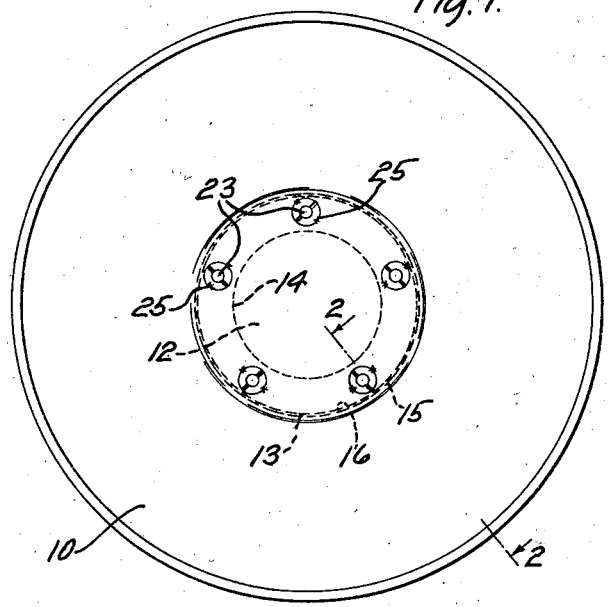

Referring now to the drawing, wherein like reference numerals designate similar parts, heads 10 are shown with their peripheries rolled and with circular depressed portions 12 positioned adjacent the centers thereof. The circular depressed portions 12 are equal in inside diameter to the outside diameter of a drum 13, the drum having inwardly directed annular flanges 14 receivable in the depressed portions 12 and arranged to abut the inner walls thereof. The ends of the drum 13; that is, the portions between the cylindrical wall of the drum and the annular flanges 14, indicated at 15, are disposed adjacent and rest upon a shoulder 16 formed by the depressed portion 12. At spaced positions, and in circular arrangement within the depressed portions 12 of the heads are inwardly extending annular bosses 18 forming embossed apertures 19 with walls arcuate shape in cross-section. At corresponding positions in the flanges 14 of the drum are formed inwardly extending bosses 20 forming embossed apertures 21 conforming to and arranged to receive the annular bosses 18 of the heads.

Extending between the heads are a plurality of bolts 23 having threaded ends extending through the embossed apertures 19 and provided with round head nuts 25 which have slots therein. The nuts 25 are flared outwardly at the heads thereof forming arcuate shaped portions conforming to the walls of the embossed apertures 19 and terminate, with the rounded outer surfaces thereof, adjacent to or flush with the outer surface of the heads 10 when positioned in the apertures.

In assembling the reel, the heads 10 are so positioned upon the ends of the drum 13, that the annular flanges 14 will be received in the depressed portions 12 of the heads, and the bosses 18 of the embossed apertures 19 will extend into and closely engage the walls of the embossed apertures 21. The through bolts 23 are then extended between the heads within the drum 13 and through the embossed apertures 19. By turning the nuts 25 the walls of the depressed portions 12 are moved into close engagement with the annular flanges 14 so that the edges 15—15 of the drum will extend into the depressed portions 12 and rest upon the annular shoulders 16. The nuts may be tightened by the aid of any suitable tool such as a screw driver, and when tightened sufficiently they may be firmly secured by welding.

With this construction, the drum will be in intimate engagement with the heads and wire may be wound upon the reel without the possibility of it becoming lodged between the drum 13 and the heads 10. Furthermore, the drum 13 is firmly supported by the heads 10 and held against displacement by the bosses 20 encircling the bosses 18 so as to aid in holding the drum 13 against displacement relative to the heads.

Figure 3:
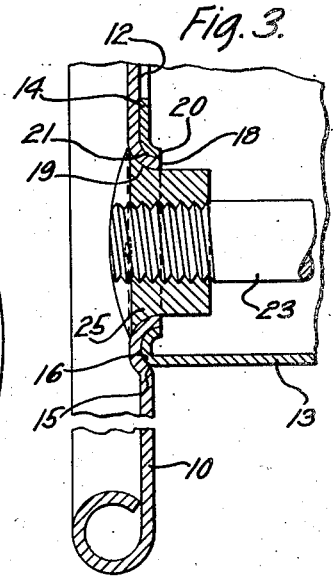
Fig. 3 is an enlarged fragmentary sectional view of a portion of the reel.
Figure 2:
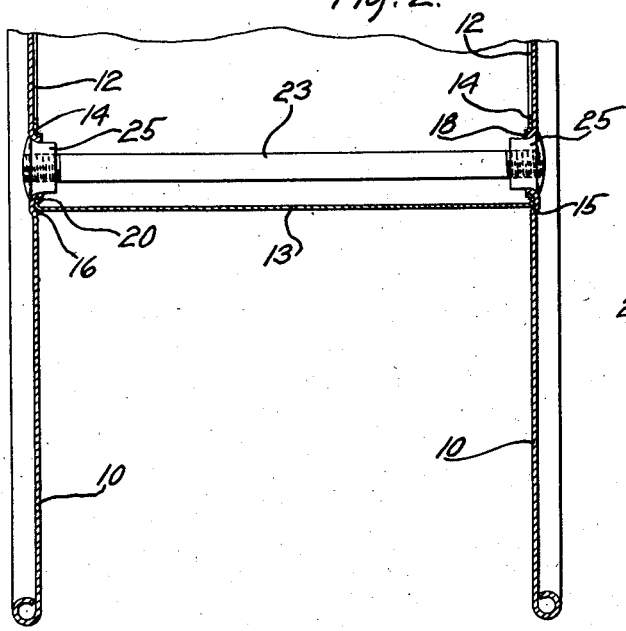
Fig. 2 is an enlarged sectional view taken along the line 2—2 of Fig. 1.
Figure 4:
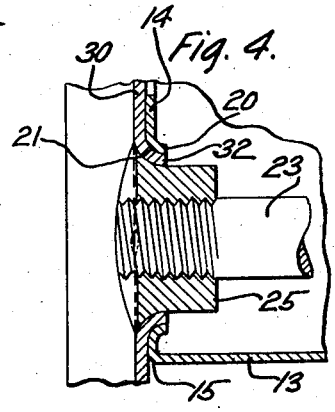
Fig. 4 is a fragmentary detailed sectional view of another species of this invention.

In Fig. 4 there is shown another species of the invention, a structure which is identical to that shown in Figs. 1 to 3, inclusive, with the exception of the heads of the reel which are not provided with depressed portions such as those indicated at 12 in Fig. 3. In this structure, there are two heads 30 separated by the drum 13 and secured in assembled relation by the through bolts 23 and nuts 25. For the purpose of illustration, only a fragmentary detailed portion of this species of invention is shown. Heads 30 have apertures formed by inwardly projecting annular bosses 32 receivable in the embossed apertures 21 in the flanges 14 of the drum 13. Extending between the heads, within the drum and through the embossed apertures are the through bolts 23, upon the threaded ends on which, are disposed the nuts 25, portions of which conform to the embossed apertures in the heads. When the nuts 25 are tightened, the outer edges 15 of the drum 13 are positioned in close engagement with the heads 30 and provide substantially a square corner.

Although there is herein shown and described a specific embodiment of the invention, it should be understood that the invention is capable of other applications and should be limited only to the scope of the appended claim.

What is claimed is:

A reel comprising a drum having a flange at each end thereof provided with an apertured embossed portion, a head engaging each flange of the drum and provided with a corresponding apertured embossed portion, the embossed portions of the flanges and the associated heads being constructed so that one extends within the other and closely engages the inner wall of the aperture thereof, and connecting members extending through the apertured embossed portions of both heads and having means at both ends thereof countersunk within said embossed portions for securing the heads to the flanges of the drum.

RALPH W. CLEMMONS.